Oct. 9, 1951     W. J. BOHNET ET AL     2,570,311
ELECTRIC INDUCTION FURNACE
Filed June 1, 1949
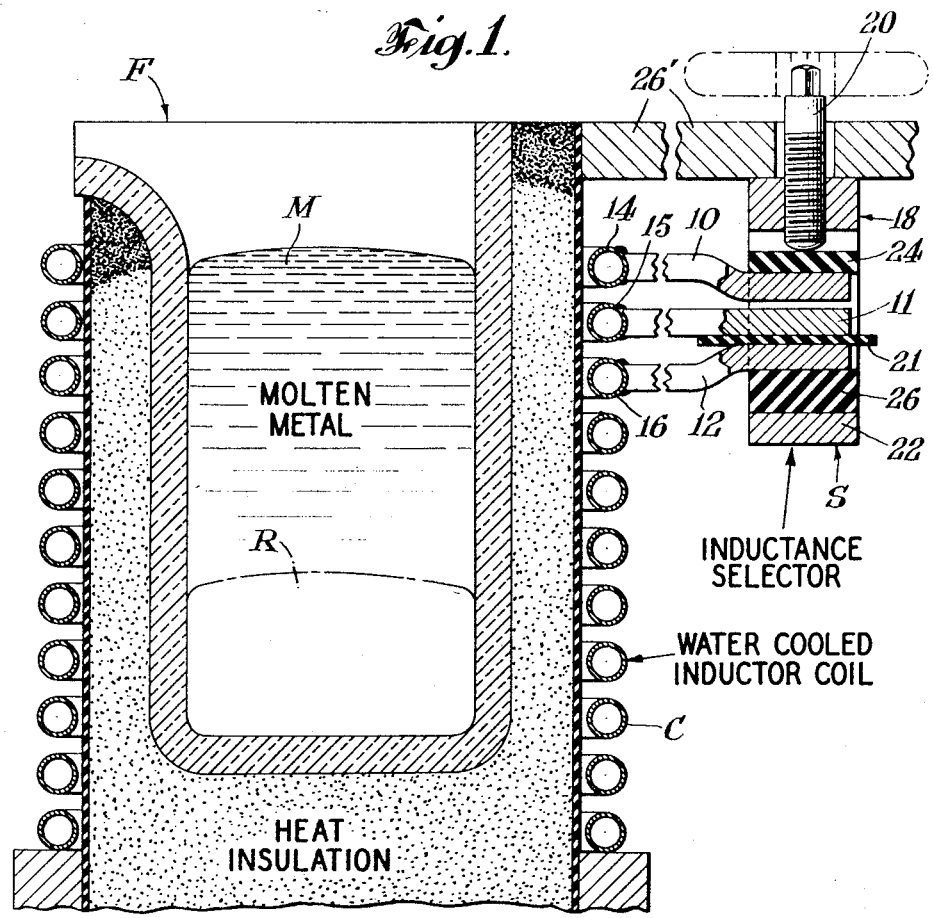
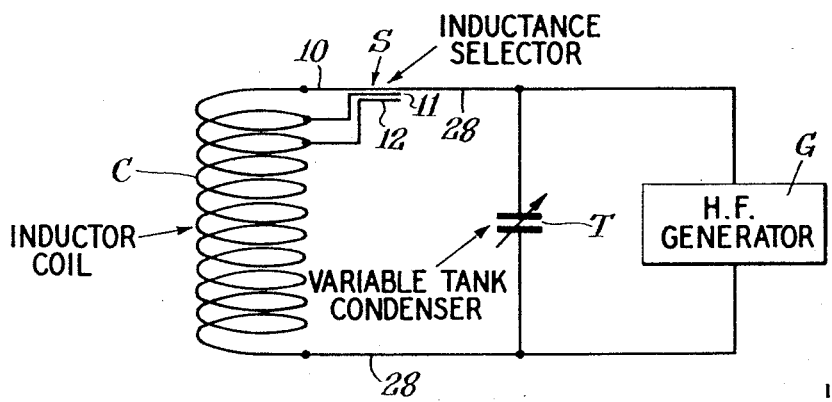
INVENTORS
WILLIAM J. BOHNET
GLEN D. BAGLEY
BY D.C. Harrison
ATTORNEY Patented Oct. 9, 1951

2,570,311

UNITED STATES PATENT OFFICE 2,570,311

ELECTRIC INDUCTION FURNACE

William J. Bohnet, New York, and Glen D. Bagley, Lewiston, N. Y., assignors to Union Carbide and Carbon Corporation, a corporation of New York Application June 1, 1949, Serial No. 96,596

5 Claims. (Cl. 13—27)

This invention relates to high-frequency electric induction furnaces for melting and pouring metal.

In the past such furnaces were designed to handle melts of substantially fixed size, and are subject to serious operating difficulties when upon loading pieces of scrap metal in a furnace, for example, the spaces between the solid metal pieces have the effect of reducing the heating capacity, so that considerable time is required to properly charge the furnace, and subsequently melt that charge. This reduction of heating capacity is due to high inductance brought about by the poor coupling of such a charge and the high frequency furnace coil. Also, when the molten metal is being poured into ladles for casting small objects the effective heating capacity falls rapidly as the amount of liquid metal in the furnace is reduced. This slow pouring and the loss of coupling of the metal causes a relatively large amount of metal to freeze in the furnace before it can be emptied. This reduces the melting capacity and adds to the overall time consumed in melting and pouring the metal of each heat. Another difficulty was that smaller heats could not be made economically in furnaces designed for larger charges, which greatly adds to the cost of the necessary additional equipment in each plant as various sized furnaces must be available.

The main object of this invention is to provide an improved high-frequency electric induction furnace and a novel method of operating the same so that such difficulties are overcome. Another object is to provide novel switch means for selectively short-circuiting top-turns of the water-cooled coil of a high-frequency induction furnace for melting metal, even while the furnace is in operation (as only a momentary power shutdown is necessary) which is simple and economical in its parts, can be incorporated in commercial furnaces now available with little difficulty, and is effective and efficient in operation. A further object is to provide an improved method of operating an induction furnace. Other objects will be clear to those skilled in the art from the following description.

According to the invention there is provided a new method of operating a high-frequency induction furnace which comprises switching a short-circuit including some of the upper turns of the inductor coil thereof in accordance with the requirements of the metal load in order to maintain the full power input of the furnace.

More particularly according to the invention there is provided a high-frequency induction furnace for melting metal, comprising a water-cooled coil the upper turns of which have laterally extending flat straps or bars of metal brazed thereto in such a way that the bars are normally out of contact with one another, and a switch consisting of an adjustable clamp for springing the free ends of bars to move portions thereof into direct contact with one another, thereby short-circuiting the coil turns as desired, even when the furnace is in operation.

In operation the switch is adjusted to short-circuit the top turns of the coil, which decreases the effective inductance and permits greater power input. This increases the speed of melting the cold metal, such as scrap, as it is loaded in the furnace. As the amount of air space in the furnace is replaced by metal the improved coupling lowers the inductance and the switch is again adjusted to remove such short-circuit from such turns. When the resulting melt is poured in small quantities over an extended length of time, the top turns of the coil are again short-circuited, through the adjustment of such switch, with the result that all of the metal can be held at temperature and can be poured out of the furnace. Through this control of inductance by adjustment of furnace proportions the furnace can be operated substantially at 100% utilization of the power source throughout the entire heating, melting and pouring operation.

Not only does the invention increase the overall efficiency of melting and pouring metal, but smaller heats can be made in larger furnaces, reducing the volume of various sized furnaces and necessary equipment to maintain these furnaces. At least one more heat per day can be poured per furnace. Furthermore, existing equipment can be cheaply and easily modified to include the invention.

In the drawing:

Fig. 1 is a fragmentary view mainly in vertical section of an electric high-frequency induction furnace for melting metal, illustrating the invention; and Fig. 2 is a simplified circuit diagram.

The furnace F is, in general, of conventional construction except for the incorporation therewith of the inductance selector or top-turns short-circuiting device S. The latter comprises flat bars 10, 11 and 12 of metal such as copper which are brazed to the sides of the water-cooled inductor coil C of the furnace. The free ends of the bars are normally spaced apart vertically so that the turns 14, 15 and 16 to which the inner ends of the bars are connected are not short-circuited. However, an adjustable clamp 18 is provided by means of which the free ends of the bars can be sprung into contact with one another by simply turning a screw 20 constituting a part of such clamp. The clamp also includes a rectangular frame 22 containing the free ends of the bars 10, 11 and 12 and members 24 and 26 of suitable insulating material disposed above and below such bars. The clamp 18 is mounted on a suitable support 26' located adjacent the top of the furnace F.

For example, in a 650-pound furnace, ¼-inch thick by 4-inch wide by 8-inch long copper bars may be used. However, depending on the average operating power levels of the furnace it may be necessary to add water cooling. Naturally, these dimensions can be decreased or increased depending on the size of the furnace and the power consumed. Before installing the bars they are offset so that, when clamped between spacers, the inner ends match the centers of the turns of the furnace coil. After soldering or brazing the inner ends of the bars to the sides of the coil turns, the spacers are removed. To short-circuit the turns, the clamp is tightened by turning screw 20, bringing the bar surfaces into electrical contact. By inserting an insulator 21 between bars 11 and 12 before clamping, only one turn may be shorted. Any desired number of bars may be used to short-circuit the desired number of coils without departing from the invention.

The inductor coil C is electrically connected by conventional means including water-cooled cables 28 to a high-frequency generator G and a variable tank condenser T in parallel circuit relation therewith in the usual way. Without the top-turn short-circuiting switch S, the inductance of the furnace coil C changes, depending on the kind and volume of metal coupled with the coil. For instance, the effective inductance of the furnace coil is high when the furnace is charged with cold metal. This value of inductance rapidly decreases as the metal goes through the Curie point and reaches a low value of inductance when the furnace is full of molten metal. Then, as the metal is tapped, the volume decreases and the inductance rises again. Simultaneously, with the change in inductance, there should be a change in capacitance in order to maintain unity power factor, since the tank circuit must resonate at the frequency of the generator supplying the power. Due to the necessary change of capacity, the power input to such a charge goes from low value through maximum and back to the low value again.

This situation can be corrected in several ways but none has the economy and simplicity of our invention. For instance, the effective inductance can be changed by using a tapped coil, in which case, it would be necessary to disconnect and reconnect water-cooled cables carrying a current of the order of 3000- and 4000-amperes. This represents considerable work to be done two or three times during each heat. Secondly, by having overpowered generators, the low power periods would be corrected, but the capital expense and size of equipment would be increased. By comparison, the present invention accomplishes the same result by simply turning the screw 20.

A high-frequency (3,000 cycle) electric induction furnace is now marketed for melting about 650 pounds of metal alloy in each heat. However, considerable difficulty has been experienced when making 650 pound heats, due to the fact that, when pouring the metal M, the power output of the generator G is reduced as the amount of metal in the crucible is decreased. Actually, it was impossible to maintain proper pouring temperature when the residual metal R was 150 pounds or less, as only 50 kw. of the available 100 kw. could be maintained.

According to this invention, a substantial improvement in the operation of such high-frequency furnace was realized by the installation of a short-circuiting switch S for the top turns of the furnace coil. With this switch the difficulty of the freezing of the last 150 pounds of metal R in a 650-pound melting and pouring operation was eliminated. It is estimated that, because of the greater latitude of operation, the output of the furnace thereby is increased by 25%.

The use of switch S modifies the inductance when the coil C is coupled only with a small amount of residual metal R. The effective condenser capacity used can then be increased, permitting a greater power utilization from the generator. For example, without the switch S, the maximum power that could be impressed was 50 kw., which was not enough to keep the last 150 pounds of metal R hot enough for pouring. With this switch S in use, however, it was possible to maintain the total 100 kw. output of the generator, down even to the last 20 pounds of metal. The switch was also useful at the beginning of the heat, as it was possible to maintain full capacity of the generator while the charge was going through the changes in electrical coupling attending the transition of solid pieces to a single body of liquid metal.

The invention makes possible for the first time the efficient use of furnaces for fractional charges, or heats smaller than full capacity. Thus, it is not necessary to buy a separate furnace for each size of heat. One large furnace, for example, can be used to melt efficiently a heat of any desired size up to that of the full capacity of the furnace; which was not possible prior to the invention. The invention is also especially useful when a melt is to be poured slowly, or in stages or in batches.

What is claimed is:

1. In a high-frequency electric induction furnace for melting metal, the combination with a water-cooled inductor coil in circuit relation with a high frequency generator and a tank condenser, of an inductance selector switch comprising flat bars of metal each secured at one end to the top turns of said coil, said bars having free ends normally spaced from one another, and an adjustable clamp by means of which the free ends of the bars can be sprung into contact with one another, so as to short-circuit such top turns of the coil when the furnace is in operation, said clamp comprising a rectangular frame containing the free ends of the bars, members of suitable insulating material disposed above and below such bars, and a screw threaded to said frame and engaging one of said insulation members.

2. The combination with a high-frequency electric induction furnace for melting a metal charge by direct induction, comprising a water-cooled inductor coil in circuit relation with a high-frequency generator and a tank condenser, of a switch for selectively short-circuiting the top turns of said coil, comprising metal members secured to such turns in normally spaced relation with one another, and adjustable means for springing said members into direct contact with one another, to thereby short-circuit such turns.

3. The combination with a high-frequency electric induction furnace for melting a metal charge by direct induction, comprising a water-cooled inductor coil in circuit relation with a high-frequency generator and a tank condenser, of means for selectively short-circuiting the top turns of said coil.

4. In a high-frequency electric induction furnace for melting a metal charge by direct induction, a water-cooled inductor coil of a plurality of turns, a high-frequency generator and a tank condenser in circuit relation with said inductor coil, and means for connecting a conductor of negligible resistance directly across a portion of said turns of the inductor coil to maintain substantially full power input when the amount of metal in the furnace is less than the full capacity thereof.

5. In a high-frequency electric induction furnace for melting a metal charge by direct induction, a water-cooled inductor coil and a condenser connected in a parallel resonant circuit therewith and a high-frequency power source, means for short-circuiting the upper turns of the inductor coil in succession from the top down.

WILLIAM J. BOHNET.
GLEN D. BAGLEY.

REFERENCES CITED

The following references are of record in the file of this patent:

UNITED STATES PATENTS

| Number | Name | Date |
| --- | --- | --- |
| 1,752,887 | Chutter | Apr. 1, 1930 |
| 1,852,938 | Samuel | Apr. 5, 1932 |
| 1,896,269 | Willoughby | Feb. 7, 1933 |
| 2,052,649 | Patterson | Sept. 1, 1936 |

FOREIGN PATENTS

| Number | Country | Date |
| --- | --- | --- |
| 17953/29 | Australia | Dec. 21, 1929 |
| 328,636 | Italy | Aug. 14, 1935 |
| 599,553 | France | Oct. 23, 1925 |